United States Patent [19]

Even

[11] Patent Number: 5,268,603
[45] Date of Patent: Dec. 7, 1993

[54] ROTARY ELECTRICAL MACHINE WITH ZIG-ZAG SHAPED CONDUCTORS

[75] Inventor: Denis Even, Cergy, France

[73] Assignee: Labavia - SGE, Montigny-le-Bretonneux, France

[21] Appl. No.: 889,190

[22] Filed: May 28, 1992

[30] Foreign Application Priority Data

Jun. 6, 1991 [FR] France ................. 91 06877

[51] Int. Cl.⁵ .................. H02K 5/18; H02K 1/32; H02K 3/24; H05B 3/02
[52] U.S. Cl. ........................ 310/64; 310/61; 219/202
[58] Field of Search ........... 310/52, 58, 59, 60 R, 310/60 A, 61, 62, 63, 64, 65, 211, 261, 273; 219/202, 209

[56] References Cited

U.S. PATENT DOCUMENTS

| | | | |
|---|---|---|---|
| 1,996,460 | 4/1935 | Coates | 310/62 |
| 2,112,743 | 3/1938 | Poole | 165/185 |
| 2,661,434 | 12/1953 | Kilbourne | 310/64 |
| 2,664,512 | 12/1953 | Huntley | 310/64 |
| 2,727,161 | 12/1955 | Kilner et al. | 310/64 |
| 3,423,616 | 1/1969 | Jacobs | 310/105 |
| 3,671,714 | 6/1972 | Charns | 219/203 |
| 5,051,634 | 9/1991 | Overton | 310/64 |
| 5,140,204 | 8/1992 | Cashmore et al. | 310/61 |

FOREIGN PATENT DOCUMENTS

| | | |
|---|---|---|
| 857393 | 9/1940 | France . |
| 928011 | 11/1947 | France . |
| 822313 | 10/1959 | United Kingdom . |

Primary Examiner—Emanuel T. Voeltz
Assistant Examiner—D. R. Haszko
Attorney, Agent, or Firm—Larson and Taylor

[57] ABSTRACT

A rotary electrical machine for heating a flow of air comprises a primary magnetic circuit suitable for creating a ring of magnetic poles of polarity alternating from pole to pole, and a secondary magnetic circuit suitable for moving relative to the primary magnetic circuit with the circuits being separated by a cylindrical air gap. The secondary magnetic circuit comprises a cylindrical sleeve (1) of laminated ferromagnetic material having a ring of rectilinear notches (4) formed in the vicinity of one of its two cylindrical faces, these notches extending parallel to the axis of the sleeve and being open at both axial ends. Each of the notches receives a zig-zag corrugated copper sheet (6) and the two axial margins ($6_3$) of each sheet project axially beyond the sleeve and are electrically interconnected with the adjacent margins of the other sheets by two copper rings (8) disposed at opposite axial ends of the sleeve.

11 Claims, 5 Drawing Sheets

ROTARY ELECTRICAL MACHINE WITH ZIG-ZAG SHAPED CONDUCTORS

The present invention relates to an electrical rotary machine comprising a primary magnetic circuit organized when connected to a source of electricity to create a ring of magnetic poles of polarities that alternate from pole to pole, and a secondary magnetic circuit arranged so that when the machine is in operation, relative displacement is observed between the primary and secondary magnetic circuits across a circularly cylindrical air gap that is narrow, the secondary magnetic circuit including a cylindrical sleeve made of laminated ferromagnetic material and hollowed out in the vicinity of the air gap by a ring of rectilinear notches extending parallel to the axis of the sleeve and open at both axial ends, each of the notches receiving a component of electrically conductive material, the two axial ends of said components projecting axially from the sleeve and being electrically interconnected by two rings of electrically conductive material disposed at opposite axial ends of the sleeve.

In known embodiments of such machines (Documents GB-A-822313 and FR-A-857 393), which are in general squirrel cage induction motors and not heat-generating machines, the conducting parts completely fill the notches in which they are disposed, so that there is no way in which air can be made to flow in them for heat exchange purpose.

A main object of the present invention is to make a rotary machine of the above-defined kind suitable for use essentially as a source of heat, in particular for the purpose of heating the cab or passenger compartment of a vehicle, the rotor of said machine then being angularly linked either to the transmission shaft of the vehicle, or else to the engine shaft of the vehicle, in particular via a set of belts and pulleys.

To this end, according to the invention, rotary machines of the kind in question are essentially characterized in that the conductive components received in the notches are zig-zag corrugated sheets forming channels for axial air flow between their corrugations, and in that means are provided for causing air to flow along said channels.

In preferred embodiments, one or more of the following dispositions are included:

the outside faces of the arcs of each corrugated sheet are closely received in complementary grooves formed in the corresponding side faces of the notches;

the lengths of each corrugated sheet extending between its arcs are slightly curved;

if the secondary magnetic circuit constitutes the rotor of the machine, then the curvature of the lengths is such that their concave sides face radially outwards;

the general shape of the cross-section of each notch is trapezium-shaped so that the portions of the sleeve extending between two successive notches present substantially the same circumferential thickness at all radial points thereof;

the rings of electrically conductive material have notches formed therein with the same profile as the notches formed in the sleeve, and have the ends of the corrugated sheets passing through them similarly;

the means for causing air to flow along the channels include at least one ring of blades secured to the rotor;

the machine is fitted with an outlet volute and with ducts suitable for connecting the axial outlets of the various notches in the secondary magnetic circuit to said volute so as to give rise to a single flow of hot air at the outlet from the machine;

the thickness of the conductive sheet lies in the range 0.1 mm to several mm;

the mutual radial spacing between the successive lengths of the corrugated sheet lies in the range 1 mm to 5 mm, being preferably about 2 mm; and the number of notches lies in the range 6 to 100 or more, and is preferably equal to 24.

In addition to the above main dispositions, the invention includes certain other dispositions that are preferably used simultaneously therewith and that are explained in greater detail below.

There follows a description of several preferred embodiments of the invention given with reference to the accompanying drawings and by way of non-limiting example.

FIG. 1 of the drawings is a diagrammatic end view showing a portion of a rotary electrical machine of the invention.

Figure 1:
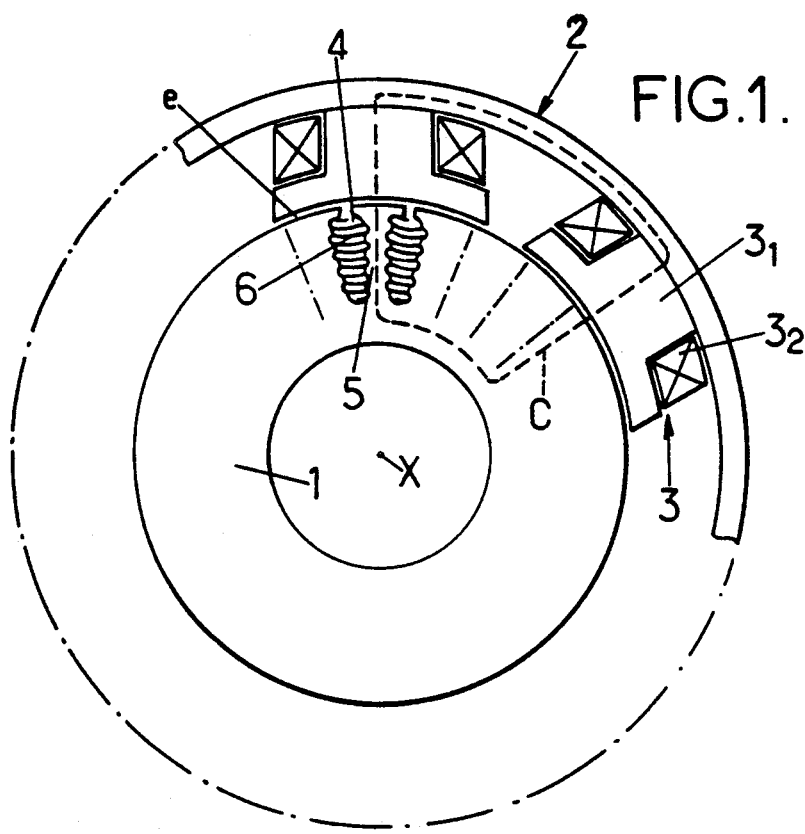

In each case, the rotary electrical machine under consideration is constituted by a secondary magnetic circuit comprising a circularly cylindrical sleeve 1 about an axis X and by a primary magnetic circuit 2 which is coaxial with the secondary magnetic circuit and which is suitable for generating a magnetic field across an air gap of small radial extent e, either from outside the outer cylindrical face of the sleeve (FIGS. 1 to 4), or else from inside the inner cylindrical face of said sleeve (FIGS. 5, 6, and 7) by means of a ring of angularly equidistant field-inducing poles 3, there being an even number of said poles and their polarities alternating from pole to pole.

The secondary magnetic circuit 1 may be inside or outside the primary magnetic circuit and it may form a portion of the rotor or of the stator.

In the first embodiment shown in FIGS. 1 to 4, the secondary magnetic circuit is constituted by a rotor and it is placed inside the primary magnetic circuit.

The cylindrical sleeve constituting the secondary magnetic circuit is made of ferromagnetic material.

More precisely, it is made up of an axial stack of thin cutout laminations $1_1$ of such a material, with the various juxtaposed laminations being electrically insulated from one another by interposing an appropriate coating such as an insulating varnish.

The thickness of each lamination generally lies in the range 0.5 mm to 2 mm, and in particular, is about 1 mm.

In addition, a ring of channels or notches 4 extending parallel to the axis X is hollowed out in the secondary magnetic circuit 1 close to the cylindrically outer face thereof.

Figure 2:
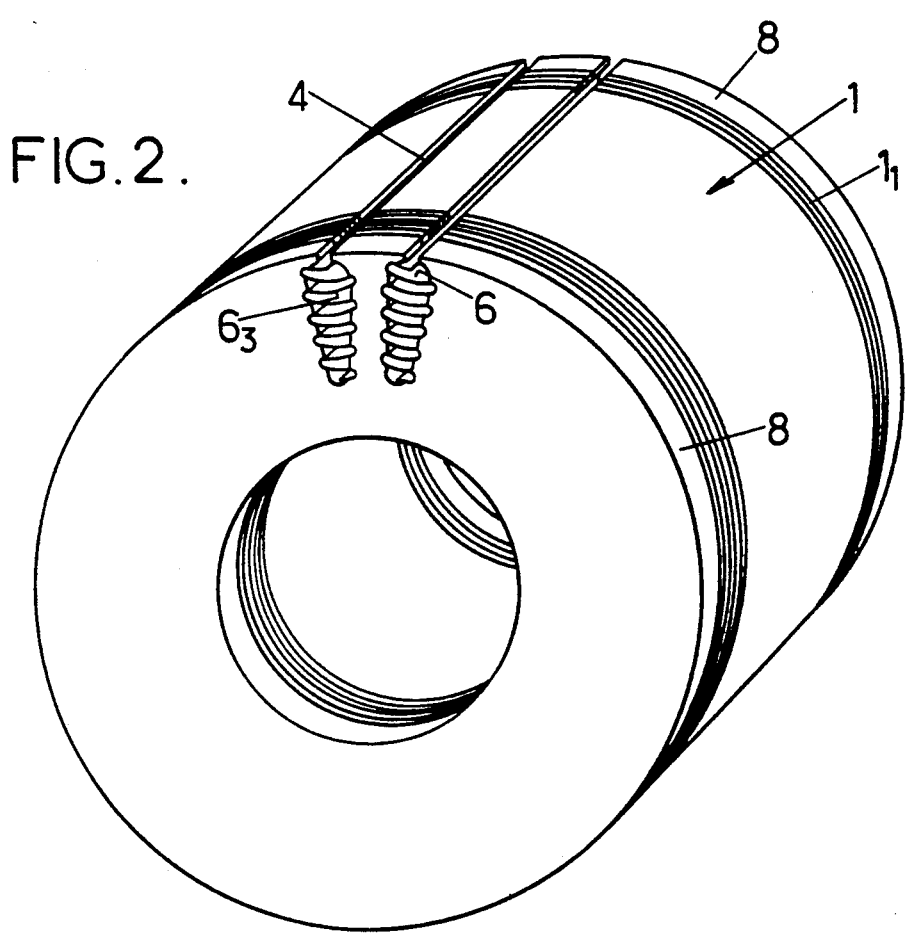
FIG. 2 is a perspective view of the rotor of said machine.
Figure 3:
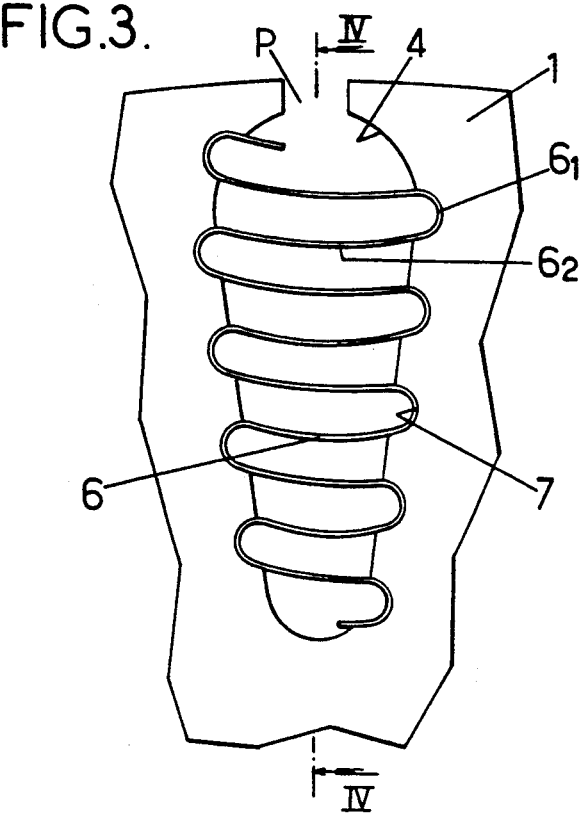
FIG. 3 is an enlarged view of the portion of FIG. 1.

As can clearly be seen in FIGS. 1 to 3, the cross-section of each notch 4 is advantageously in the form of a trapezium that converges slightly towards the axis X so that the portions 5 of ferromagnetic sleeve lying between two successive notches are all of substantially constant circumferential thickness at all radial positions: this technique serves to avoid forming points of constriction in the circuit C available to the magnetic flux within the secondary magnetic circuit.

The notches 4 may be closed radially. In the embodiments shown, these notches are open radially, but they communicate with the outside of the sleeve via constrictive passages P (FIG. 3).

Each of the notches 4 is lined with a zig-zag corrugated sheet 6 made of electrically conductive material.

The sheets are corrugated so as to be generally in the form of cylinders having their director lines made up of semicircular arcs $6_1$ facing successively in opposite directions and interconnected by means of substantially rectilinear lengths $6_2$ (see FIG. 3).

The arcs $6_1$ are received as a close fit in complementary grooves 7 formed in the side faces of the notches.

To avoid uncontrolled deformation of the lengths $6_2$ under the effect of thermal expansion, they are given a small amount of permanent curvature when the corresponding sheets 6 are installed, but without exceeding the elastic limit of the material from which said sheets are made: to this end, the sheets 6 are initially shaped so that the lengths $6_2$ lying between the arcs $6_1$ are plane, and the lengths $6_2$ are then caused to curve by compressing said sheets 6 slightly while they are being inserted axially into the notches 4.

In the present case where the secondary magnetic circuit forms a portion of the rotor, the curvature of the lengths $6_2$ bulges towards the axis X, thereby imparting good resistance to said lengths $6_2$ against centrifugal force.

The conductive material from which the sheets 6 are made is advantageously a dispersion alloy obtained by sintering, such as a copper with dispersed aluminum oxide ($Al_2O_3$), which alloy has good physical properties at the operating temperatures.

Where applicable, the sheet in question may be coated with a layer of nickel or other protective material, e.g. for providing protection against oxidation at high temperature.

The axial size of each sheet 6 is such that its margins $6_3$ project beyond the two axial ends of the sleeve 1.

Two conductive rings 8 are provided to provide interconnections between the margins $6_3$ of the sheets 6, thereby co-operating with said sheets to form a closed electrical circuit of the squirrel-cage type.

The rings 8 are advantageously made of copper or of a copper alloy, and they have notches with the same profile as the magnetic circuit 1 so as to be connected in like manner to the margins $6_3$ of the sheets 6.

The rings 8 may be solid or they may be made up from stacks of cutout sheets.

The total axial thickness of each ring is advantageously about half the greatest width of each of the notches 4 so as to prevent shrinkage of the electrical circuit formed in this way, which shrinkage would give rise to hotpoints.

The sheets 6 are advantageously welded or soldered to the rings 8 over their surfaces that are in mutual contact, i.e. between the arcs of the sheets and the bottoms of the grooves in the rings that receive the arcs.

The rings 8 are preferably independent from the sleeve 1 so as to allow the sheets 6 to deform thermally in the axial direction.

The thickness of each sheet 6 may lie in the range 0.10 mm to several mm.

The radial spacing between successive lengths $6_2$ in a sheet, i.e. the lengths that extend circumferentially across the notches 4, lies in the range 1 mm to 5 mm, and is preferably about 2 mm.

The number of notches is not less than six and it may reach 100 or even more: in the preferred embodiment shown, this number of notches is equal to 24.

In the embodiment shown in FIGS. 1 to 4, the primary magnetic circuit 2 has poles that project insofar as each pole 3 is constituted by a radial magnetic core $3_1$ surrounded by a coil or winding of electric wire $3_2$.

The various coils are connected to a source of direct current via appropriate control and adjustment members that are not shown.

The secondary magnetic circuit 1 is keyed angularly on a rotary shaft 9 which is angularly secured by any appropriate means to the transmission shaft of a vehicle or to the drive shaft of said vehicle, in particular via an assembly of belts and pulleys.

The shaft 9 is mounted in a casing 10 by means of bearings 11.

The casing 10 has an axial air inlet 12 for admitting air axially to one of the two axial ends of the ring of notches 4 in the above-described secondary magnetic circuit, and the axially opposite end of the notches, constituting the outlet of the secondary magnetic circuit, opens out into a ring of sloping blades 13 that form a portion of the same rotor and that constitute a centrifugal impeller.

The impeller 13 is itself housed in a volute 14 shaped so as to recover all of the air jets escaping from said impeller and to combine them to form a single flow of outlet air 15.

When the machine is excited by feeding electricity to the coils $3_2$ and the shaft 9 is caused to rotate, the electrical currents induced in the various conductors 6 of the secondary magnetic circuit cause them to heat up, and as a result the flow of air 15 is hot.

It then suffices to use appropriate ducting to direct the hot air to the cab or passenger compartment of the vehicle that is to be heated.

This heating machine is advantageous because the electrical energy required for powering the coils $3_2$ is relatively low and the major portion of the heat energy produced comes from transforming the rotary mechanical motion of the shaft 9.

Naturally, this technique is particularly advantageous when the vehicle whose cab is to be heated needs to be slowed down frequently, and in particular when the vehicle is to move down a long ramp.

Under such circumstances, the mechanical energy taken from the shaft 9 itself contributes to slowing down the vehicle, thereby constituting an advantage per se rather than constituting consumption of useful energy.

Figure 5:
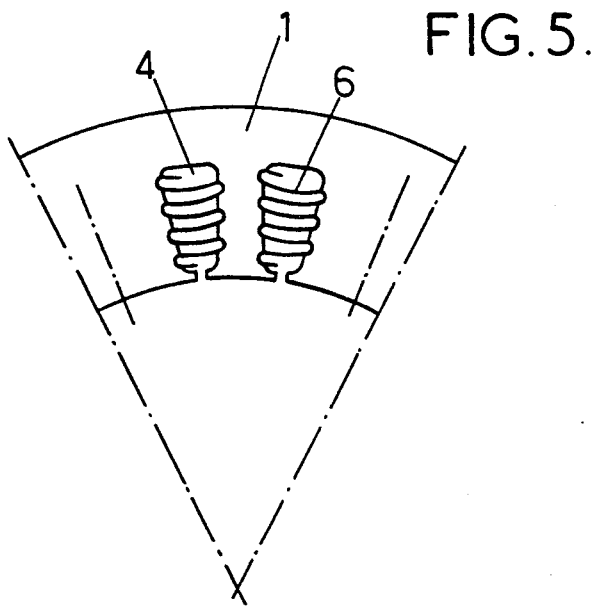
FIG. 5 is a view analogous to FIG. 1 showing a portion of another rotary electric machine of the invention.
Figure 4:
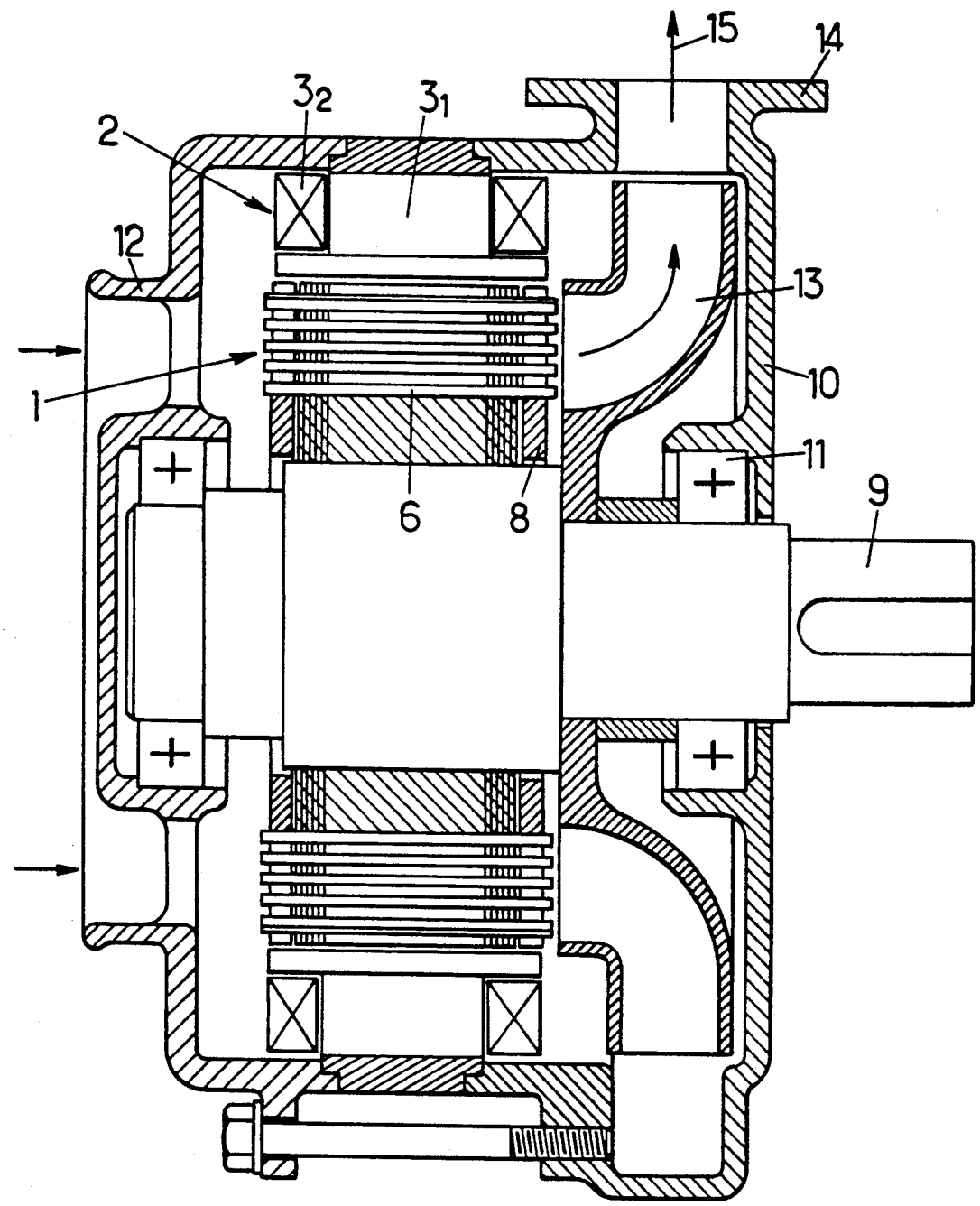
FIG. 4 is an axial section on line IV—IV of FIG. 3 showing the above rotary machine in greater detail and on a smaller scale.
Figure 6:
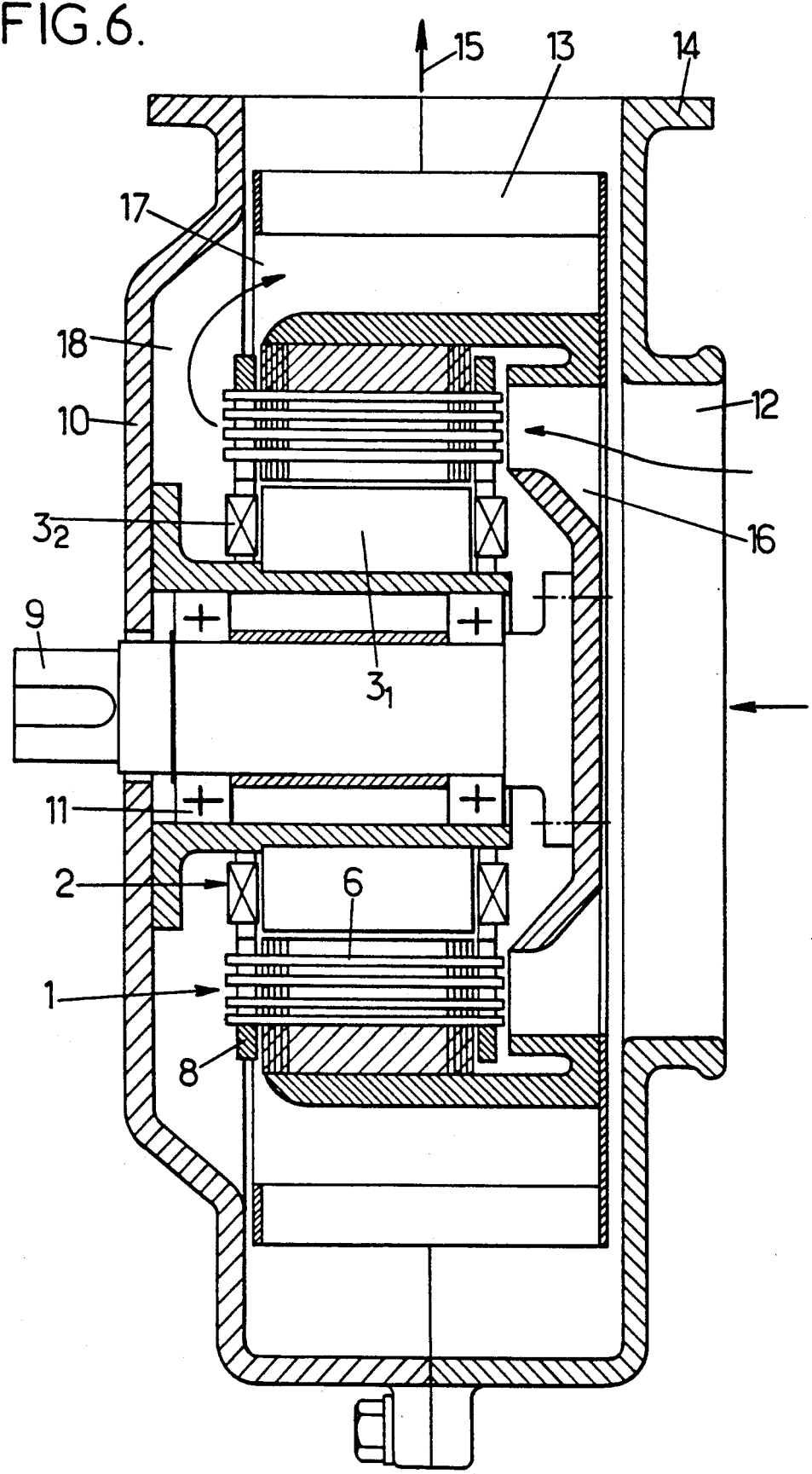
FIG. 6 is an axial section showing said machine in greater detail.

In the second embodiment shown in FIGS. 5 and 6, elements analogous to those described above are designated by the same reference numerals as before.

This second embodiment differs essentially from the first in that the notches 6 are formed in the inside face of the sleeve 1 of the secondary magnetic circuit instead of being formed in its outside face.

However, in this case the magnetic circuit 1 still forms a portion of the rotor of the machine.

The primary magnetic circuit of the type having outwardly projecting poles $3_1$, $3_2$ is then axially cantilevered from the casing 10 of the machine so as to be received radially between the shaft 9 and the secondary magnetic circuit 1, and the secondary magnetic circuit is in turn cantilevered from a ring of inlet blades 16 itself secured to one end of the shaft 9.

The centrifugal impeller 13 which opens out tangentially into the volute 14 to form the outlet flow of hot air 15 is mounted in this case around the secondary magnetic circuit, with the jets of air leaving said secondary magnetic circuit axially being guided towards a lateral inlet 17 of said impeller by a correspondingly shaped portion 18 of the casing 10.

Figure 7:
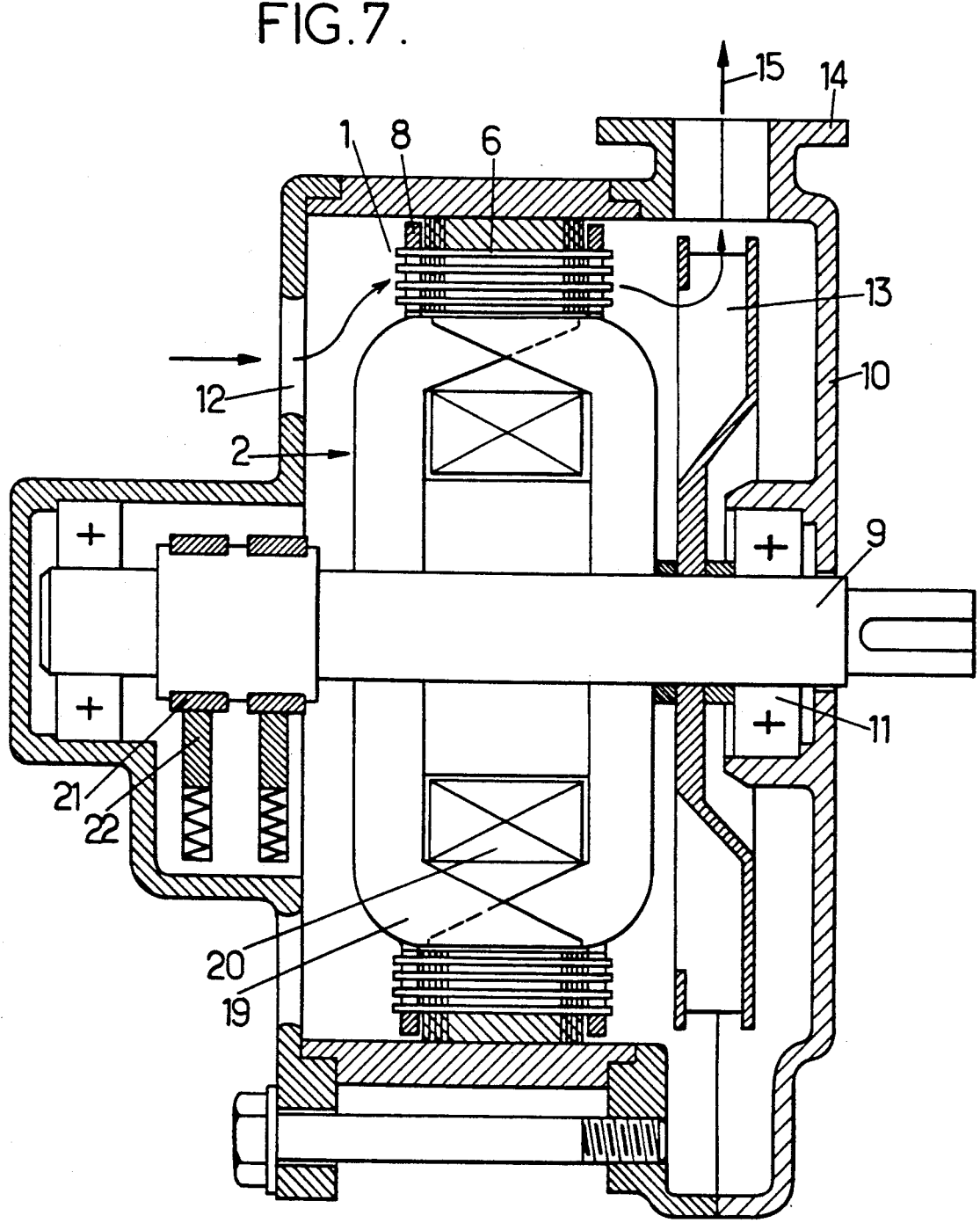
FIG. 7 is an axial section of another rotary electric machine of the invention.

The third embodiment shown in FIG. 7 in which elements that are analogous to those described above are still given the same reference as before, differs from the first two embodiments essentially in that the secondary magnetic circuit is constituted, in this case, by a portion of the stator of the machine, instead of being rotary.

This secondary magnetic circuit is again a circuit of the type comprising axially directed notches, as in the second embodiment.

The primary magnetic circuit 2 is now a rotary circuit and it is of the type having claws 19 and a single winding 20.

This third embodiment has an air inlet 12 and a centrifugal impeller 13 whose outlet is received in a volute 14, said impeller forming a portion of the rotor and its lateral inlet is disposed axially facing the outlet from the secondary magnetic circuit 1.

FIG. 7 also shows a set of two rings 21 associated with brushes 22 for feeding electricity to the coil 20 from an external electricity supply.

As a result, whichever embodiment is used, a rotary machine is obtained whose structure can be understood sufficiently from the above description.

As already mentioned above with reference to the first embodiment, this machine operates as follows.

When the shaft 9 is rotated, the impeller blades of the machine set up a flow of air that passes axially along the channels 4 of the secondary magnetic circuit 1, and that leaves the machine at 15.

So long as the primary magnetic circuit 2 is not excited electrically, this flow of air remains at ambient temperature.

As soon as the primary magnetic circuit 2 is electrically excited, the relative displacements between the magnetic poles and the secondary magnetic circuit 2 has the effect of inducing heat-generating electrical currents in the sheets 6.

The flow of air passing through the secondary magnetic circuit sweeps over substantially the entire area of both faces of each of the sheets 6, thereby heating up on making contact therewith and removing a corresponding amount of heat: the outlet flow of air 15 is therefore hot and can be used for the purpose of heating the cab of the vehicle.

It may be observed that this heat energy constitutes a very small fraction of the mechanical energy available on the vehicle.

It is true that this energy must be produced by the engine of the vehicle whenever there is no need to slow the vehicle down.

However, all of the necessary energy is freely available, and indeed too much energy is available, during periods when the vehicle needs to be slowed down.

During such periods, the machine can be considered as means for slowing the vehicle, with the heat energy produced during such periods optionally being dumped outside the vehicle if there is not any need to heat its cab.

Independently of thermal considerations, generating a flow of air 15 requires some of the available mechanical energy to be used.

This fraction is relatively small, but it can be reduced still further so as to become negligible in practice during periods when there is no need for heating and when there is no need to slow the vehicle down, merely by providing means for declutching the impeller, and preferably by providing means that are automatic.

Naturally, and as can be seen from the above, the invention is not limited to those applications and embodiments that have been described in particular: on the contrary, the invention extends to any variants thereof.

I claim:

1. An electrical rotary machine comprising:
   a primary magnetic circuit including a ring of magnetic poles whose polarities alternate from pole to pole when said primary magnetic circuit is connected to a source of electricity;
   a secondary magnetic circuit arranged for relative displacement with said primary magnetic circuit across a circularly cylindrical air gap that is narrow, said secondary magnetic circuit including
      a cylindrical sleeve made of laminated ferromagnetic material and having a longitudinal axis and opposite axial ends,
      a ring of rectilinear notches formed as hollowed out portions of said sleeve in the vicinity of the air gap, said notches extending parallel to the axis of said sleeve and having axial ends at each end of said sleeve which are open, each said notch being bounded by opposed side faces provided with arced grooves parallel to the axis of said sleeve,
      respective components which are received in respective said notches, each said component (a) being made of an electrically conductive material, (b) having axial ends projecting axially from said sleeve, and (c) being formed as a zig-zag corrugated sheet which forms channels in said notches, which has a plurality of outside arced faces which are closely received in said arced grooves of the respective said side faces bounding said notch, and which has rectilinear lengths extending between said arced faces, and
      two rings of electrically conductive material respectively disposed at the opposite axial ends of said sleeve in contact with said axial ends of said components such that said components are electrically interconnected; and
   a flow means for causing air to flow along said channels in said notches.

2. The rotary machine according to claim 1, wherein said flow means includes an outlet volute having an air outlet and rotatable ducts in said volute for connecting the axial ends of the notches at one side of the sleeve in the secondary magnetic circuit to said volute so as to give rise to a single flow of air from the air outlet.

3. The rotary machine according to claim 1, characterized in that the rectilinear lengths are slightly curved.

4. The rotary machine according to claim 3, characterized in that the secondary magnetic circuit constitutes a rotor, and a curvature of the lengths is such that concave sides thereof face radially outwards.

5. The rotary machine according to claim 1, characterized in that a general shape of a radial cross-section of each said notch is trapezium-shaped so that portions of the sleeve extending between two successive said notches have substantially the same circumferential thickness at all radial points thereof.

6. The rotary machine according to claim 1, characterized in that the rings of electrically conductive material have corresponding notches formed therein with a same profile as the notches formed in the sleeve, and the axial ends of the components project axially from a respective said ring.

7. The rotary machine according to claim 1, characterized in that the means for causing air to flow along the channels includes at least one ring of blades secured to a displaceable one of said primary magnetic circuit or said second magnetic circuit.

8. The rotary machine according to claim 1, characterized in that the rectilinear lengths are substantially parallel and a mutual radial spacing between successive said rectilinear lengths of each corrugated sheet is 1 mm to 5 mm.

9. The rotary machine according to claim 8 wherein the mutual radial spacing is about 2 mm.

10. The rotary machine according to claim 1, characterized in that there are 6 to 100 of said notches.

11. The rotary machine according to claim 10 wherein there are exactly 24 of said notches.

* * * * *